(12) United States Patent
Meyerhofer et al.

(10) Patent No.: US 7,134,962 B2
(45) Date of Patent: Nov. 14, 2006

(54) METHOD AND APPARATUS FOR HUMAN READABLE CHARACTER SCANNING VERIFICATION AFTER PRINTING IN A GAMING PRINTER

(75) Inventors: Eric J. Meyerhofer, Oceanside, CA (US); Oleg V. Dymovsky, Los Angeles, CA (US); Mark S. Meyerhofer, La Canada, CA (US)

(73) Assignee: FutureLogic, Inc., Glendale, CA (US)

( * ) Notice: Subject to any disclaimer, the term of this patent is extended or adjusted under 35 U.S.C. 154(b) by 235 days.

(21) Appl. No.: 10/021,624

(22) Filed: Dec. 11, 2001

(65) Prior Publication Data

US 2002/0113124 A1  Aug. 22, 2002

Related U.S. Application Data

(60) Provisional application No. 60/326,080, filed on Sep. 28, 2001, provisional application No. 60/254,321, filed on Dec. 11, 2000.

(51) Int. Cl.
*A63F 13/00* (2006.01)

(52) U.S. Cl. ............... 463/47; 463/29; 225/93; 358/1.14

(58) Field of Classification Search ............ 463/25–29, 463/49, 903, 43–47, 23; 358/1.12–1.14
See application file for complete search history.

(56) References Cited

U.S. PATENT DOCUMENTS

| | | | | |
|---|---|---|---|---|
| 4,858,123 A | * | 8/1989 | Alexoff et al. ............... 101/484 |
| 5,367,148 A | * | 11/1994 | Storch et al. ............... 235/375 |
| 5,484,215 A | * | 1/1996 | Fillod et al. ............ 400/120.18 |
| 6,012,832 A | * | 1/2000 | Saunders et al. ............ 235/375 |
| 6,048,269 A | * | 4/2000 | Burns et al. .................. 463/25 |
| 6,110,044 A | * | 8/2000 | Stern ............................ 463/29 |
| 6,280,326 B1 | * | 8/2001 | Saunders ..................... 463/25 |
| 6,394,907 B1 | * | 5/2002 | Rowe ........................... 463/42 |
| 6,498,655 B1 | * | 12/2002 | Brooks et al. ............. 358/1.12 |
| 6,500,067 B1 | * | 12/2002 | Luciano et al. ............... 463/25 |
| 6,650,427 B1 | | 11/2003 | Brooks et al. ............. 358/1.12 |
| 6,886,742 B1 | * | 5/2005 | Stoutenburg et al. ....... 235/379 |
| 2002/0025850 A1 | * | 2/2002 | Hafezi ......................... 463/29 |
| 2003/0090699 A1 | * | 5/2003 | Meyerhofer et al. ....... 358/1.14 |
| 2004/0132529 A1 | * | 7/2004 | Mkrtchyan et al. .......... 463/29 |
| 2005/0109810 A1 | * | 5/2005 | Mkrtchyan et al. .......... 225/93 |

FOREIGN PATENT DOCUMENTS

| WO | WO 94/16781 | * | 8/1994 |
|---|---|---|---|
| WO | WO 98/59311 | * | 12/1998 |

* cited by examiner

*Primary Examiner*—John M. Hotaling, II
(74) *Attorney, Agent, or Firm*—Fitzpatrick, Cella, Harper & Scinto

(57) ABSTRACT

A method and apparatus for verification of a voucher after printing by a gaming printer. A human readable validation character string is received by a printer controller for printing on a voucher. A scanned validation character string is read from the voucher using an optical recognition process as the voucher is being printed. The voucher is verified by comparing the received and scanned validation character strings. If the two validation character strings are different, the voucher may be voided by the printer controller before the voucher is finished being printed.

30 Claims, 5 Drawing Sheets

METHOD AND APPARATUS FOR HUMAN READABLE CHARACTER SCANNING VERIFICATION AFTER PRINTING IN A GAMING PRINTER

CROSS-REFERENCE TO RELATED APPLICATION

This application claims the benefit of U.S. Provisional Application No. 60/254,321 filed on Dec. 11, 2000, and U.S. Provisional Patent Application 60/326,080 filed Sep. 28, 2001 which are hereby incorporated by reference as if set forth in full herein.

BACKGROUND OF THE INVENTION

This invention relates generally to gaming printers and more specifically to gaming printers with print verification features.

The gaming machine manufacturing industry provides a variety of gaming machines for the amusement of gaming machine players. An exemplary gaming machine is a slot machine. A slot machine is an electro-mechanical game wherein chance or the skill of a player determines the outcome of the game. Slot machines are usually found in casinos or other more informal gaming establishments.

Gaming machine manufacturers have introduced the use of a gaming printer allowing the printing of a voucher for a player's winnings when the player cashes out. The gaming printer may be resident in a slot machine or made available to a bank of slot machines via a gaming system. The voucher can either be redeemed with a cashier or redeemed by inserting the voucher into the same or another slot machine for playing credit, as if the voucher were money. The gaming printer's role, therefore, is to print out winnings thereby avoiding the need for the slot machine to dispense coins with each pay-out or jackpot won.

Gaming printers may be implemented using dot impact printers and thermal printers. Dot impact printers, also known as impact printers, are printers that make an image by striking an inked ribbon overlaid on plain paper with a small pin that hammers the ink onto the paper to make a small dot. Impact printers, by their electro-mechanical nature, have a number of moving parts and make a characteristic grinding sound, such as the noise made by all older receipt printers. A thermal printers is a printer where paper with a heat sensitive side is imaged using a print head which applies heat in tiny dots (typically 1/200 th of an inch in size) in order to turn an area black. In this manner, all images are created by a series of tiny black dots. A widely known example of a thermal printer is the original fax machine.

The gaming printer may be controlled by a Gaming Machine Interface Board (GMIB) such as a slot machine interface board which is a controller board for a game resident within the chassis of the game. The gaming printer may be controlled by commands sent from a host controller board such as a GMIB, or another host controller board upstream of the slot machine in order to print vouchers.

Anytime there an electro-mechanical device such as a gaming printer, there is a chance of an equipment failure that leaves the desired printing operation unaccomplished. For a thermal printer used as a gaming printer, such a failure can occur for a number of reasons: (i) the printer experiences a hardware failure; (ii) a residue or heat transfer failing which prevents a proper image from developing on the thermal paper ticket; or (iii) a failure in the paper coating process at the factory so that there is a drop out on the printed image.

Any of the above failures may prevent the ticket from printing completely. Since a voucher, sometimes with a value of $1,000 or more is being dispensed (as opposed to real currency), it is very important that the voucher delivery and redemption process is highly reliable to allay a player's fear about the handling of their "money". After a voucher is printed, the voucher can be redeemed with a cashier or the voucher can be redeemed through a slot machine's bill acceptor. A bill acceptor is a device which automatically accepts paper currency by scanning the paper currency and saving the paper currency within the slot machine. A coin change machine usually has such a device on it, and more recently, so do most slot machines. The standard vouchers for this application usually bear a barcode down the center of the voucher so that the voucher can be read automatically by the bill acceptor.

In order for the bill acceptor to properly scan the ticket, there must not be an error in the printing of the barcode, or the process will fail. Any of the previously itemized printing failures may cause the barcode to contain an error. Should such an error occur, the ticket cannot be redeemed, requiring significant casino resources to validate and hand pay the player (who at this point is probably quite nervous and has lost some of the thrill of the act of winning). A hardware failure of the printer may be detected by the communications with the GMIB, and thus an attendant may be alerted ahead of the pay out. However, previously described failure modes (ii) and (iii) are modes which may prevent the printing of a full image on the ticket and may not be detected by the GMIB or the printer. An undetected error may leave an operator of a slot machine to believe that a complete and proper pay out has been made.

Previous attempts of verification have focused on the verification of the cashout value. For example, U.S. Pat. No. 6,012,832 issued to Saunders, et al. entitled "CASHLESS PERIPHERAL DEVICE FOR A GAMING SYSTEM" discloses a method of verifying a cashout value encoded in a barcode. In the method, The cashout value is read immediately after the voucher is printed and the voucher is withheld if a printing error is detected. However, only verifying a cashout value does not fully address the verification needs of a casino. In a casino, when a player wishes to cashout with a cashier, the cashier hand enters a validation character string printed on the voucher into a terminal for verification. When a gaming machine management system verifies the entered validation character string, the voucher is paid.

Therefore, a need exists for verification of the printing of a validation character string on a voucher.

SUMMARY OF THE INVENTION

In one aspect of the invention, a method is provided for verification of a voucher after printing by a gaming printer. A human readable validation character string is received by a printer controller for printing on a voucher. A scanned validation character string is read from the voucher using an optical recognition process as the voucher is being printed. The voucher is verified by comparing the received and scanned validation character strings. If the two validation character strings are different, the voucher may be voided by the printer controller before the voucher is finished being printed.

In another aspect of the invention, a method is provided for verification of a voucher by a gaming printer. A printer controller receives a validation character string and prints the received validation character string on a voucher. The printer controller scans the voucher for a scanned validation character string and verifies the voucher using the received validation character string and the scanned validation character string.

In another aspect of the invention, the received validation character string is generated by a gaming machine interface board.

In another aspect of the invention, the received validation character string is received from a gaming machine management system.

In another aspect of the invention, the scanned validation character string is generated using an optical character recognition process.

In another aspect of the invention, the optical character recognition process is performed by a printer controller.

In another aspect of the invention, the optical character recognition process is performed by a voucher scanning device.

In another aspect of the invention, the voucher is verified by comparing the received validation character string and the scanned validation character string.

In another aspect of the invention, the voucher is voided if voucher is not verified.

In another aspect of the invention, the voucher is scanned while the voucher is being printed.

In another aspect of the invention, an apparatus is provided for verification of a voucher by a gaming printer. The apparatus includes means for receiving a validation character string and printing the received validation character string on a voucher. The apparatus further includes means for scanning the voucher for a scanned validation character string and means for verifying the voucher using the received validation character string and the scanned validation character string.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

Figure 1:
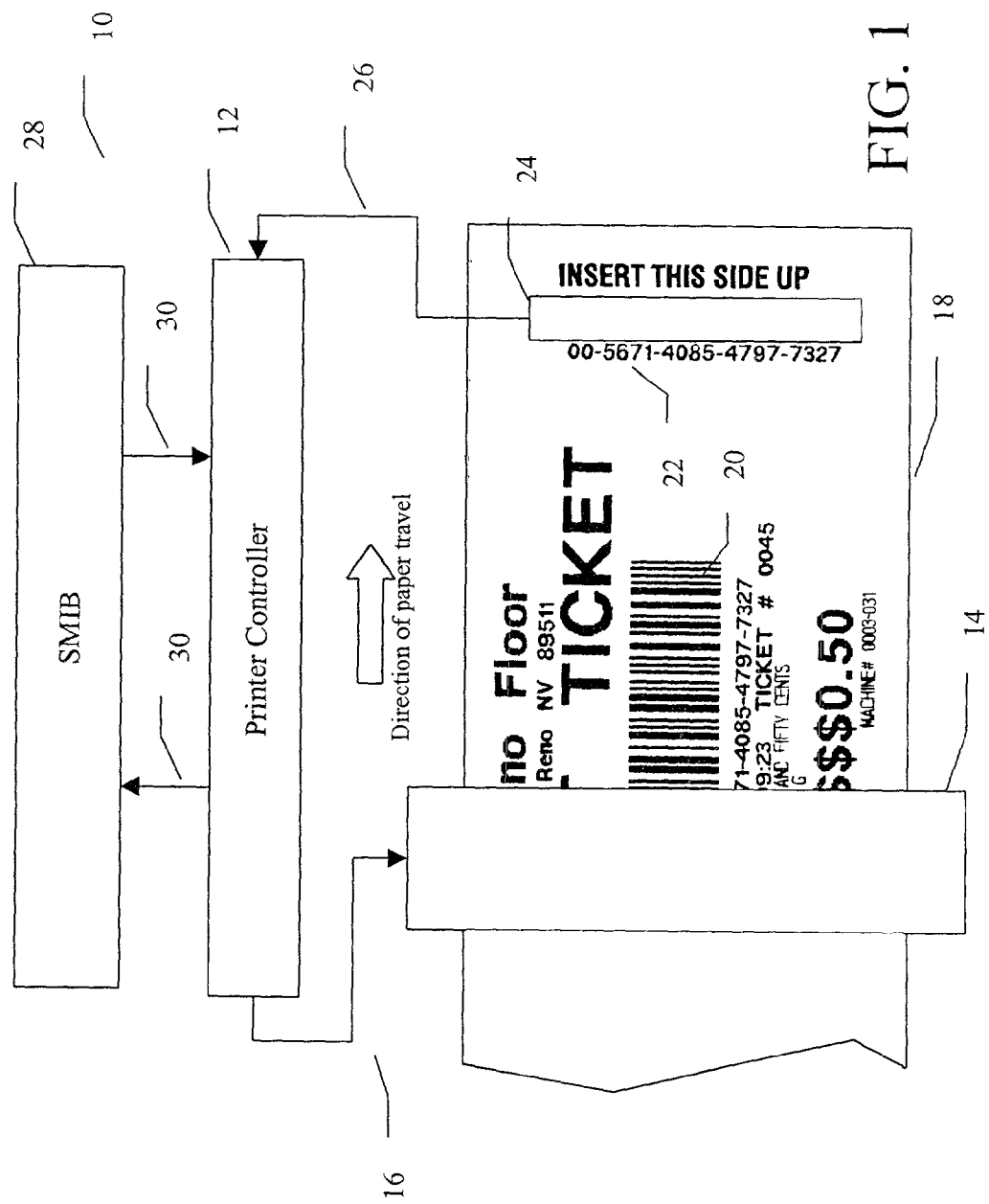
FIG. 1 is an illustration of an exemplary validation character string verification system in accordance with the present invention.

FIG. 1 is an illustration of an exemplary validation character string verification system in accordance with the present invention. A validation character string verification system 10 includes a printer controller 12 operatively coupled to a print head 14 and a voucher scanning device 24. The printer controller uses the print head to print a voucher 18 including a validation character string 22. As the voucher is being printed, the printer controller uses the voucher scanning device to scan the previously printed validation character string. If the printer controller determines that the scanned validation character string has an error, then the printer controller voids or retrieves the voucher.

In slightly more detail, the printer controller transmits print head control signals 16 to the print head. The print head control signals include voucher printing instructions for generation of the voucher by the print head. The print head uses the voucher printer instructions to print the voucher including a barcode 20 and the validation character string.

In one embodiment of a voucher in accordance with the present invention, the barcode is an encoded validation character string. In another embodiment of a voucher in accordance with the present invention, the barcode is an encoded cashout value for the voucher and the validation character string is a separate character string or number used to validate the voucher.

The voucher scanning device scans the voucher as the voucher is being printed by the print head. In one embodiment of a voucher scanning device in accordance with the present invention, the voucher scanning device is a Charged-Coupled Device (CCD) optical scanner. The voucher scanning device transmits voucher scan signals 26 to the printer controller. In one embodiment of a voucher scanning device, the voucher scan signals are unprocessed and the printer controller uses an optical character recognition (OCR) process to generate a scanned validation character string from the voucher scan signals. In another embodiment, the voucher scanning device includes an OCR process and the voucher scan signals include the recognized characters of the scanned validation character string.

In one embodiment of a validation character string verification system in accordance with the present invention, a GMIB 28 is operably coupled to the printer controller. The printer controller receives printer control instructions 30 from the GMIB. The printer control instructions include the validation character string to be printed by the printer controller on the voucher. The printer controller generates voucher verification signals 32 indicating whether or not the voucher has been verified. The printer controller transmits the voucher verification signals to the GMIB. The GMIB uses the voucher verification signals to determine if the voucher was correctly printed.

Figure 2:
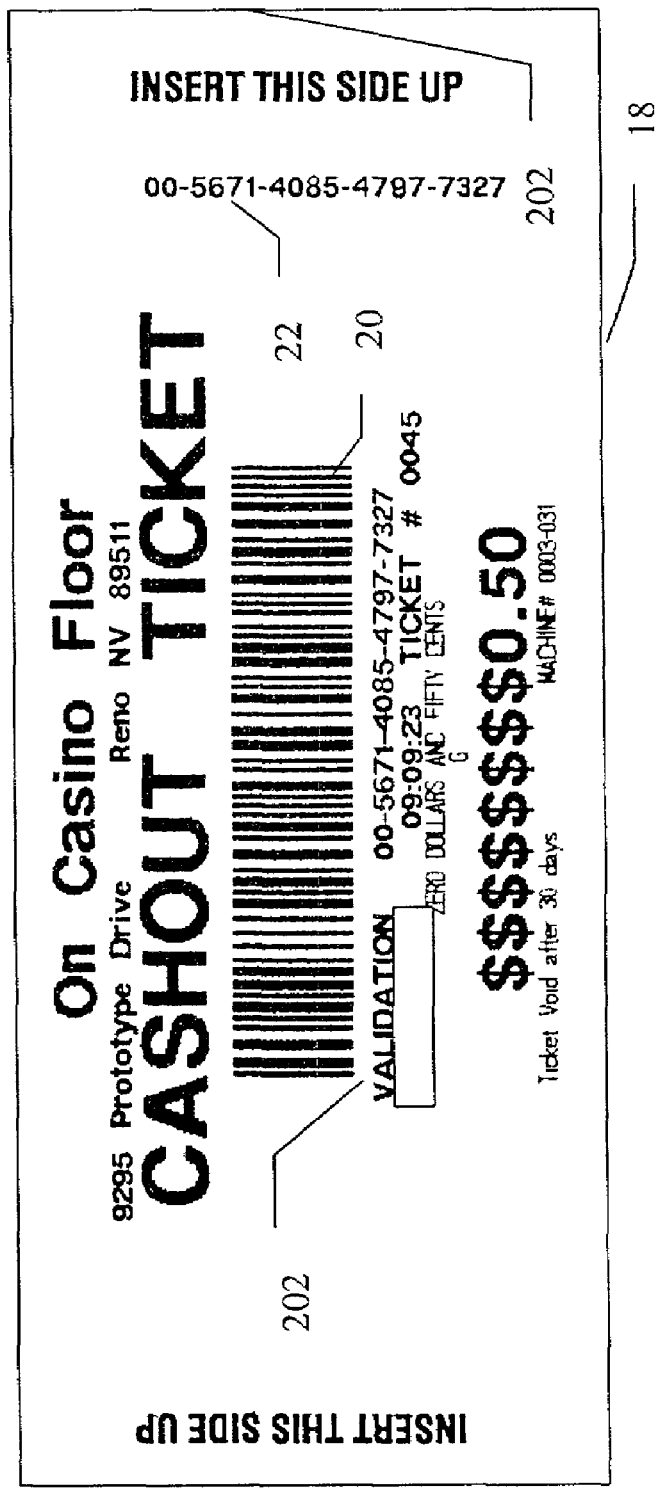
FIG. 2 is an illustration of an exemplary voucher in accordance with the present invention.

FIG. 2 is an illustration of an exemplary voucher in accordance with the present invention. Validation character strings may appear in a plurality of locations on a voucher and in a plurality of orientations. In one embodiment of a voucher, a validation character string 22 is printed near and substantially parallel to a leading edge 200 of the voucher. In another embodiment of a voucher, a validation character string 202 is located near and substantially parallel to a barcode 20. In another embodiment of a voucher, the voucher includes a single validation character string in a plurality of locations and a plurality of orientations.

The validation character string may be any sequence of human readable characters. In one embodiment of a validation character string, the validation character string includes numeric characters with interspersed spaces and dashes. In another embodiment of a validation character string, the validation character string includes alphanumeric characters.

Figure 3:
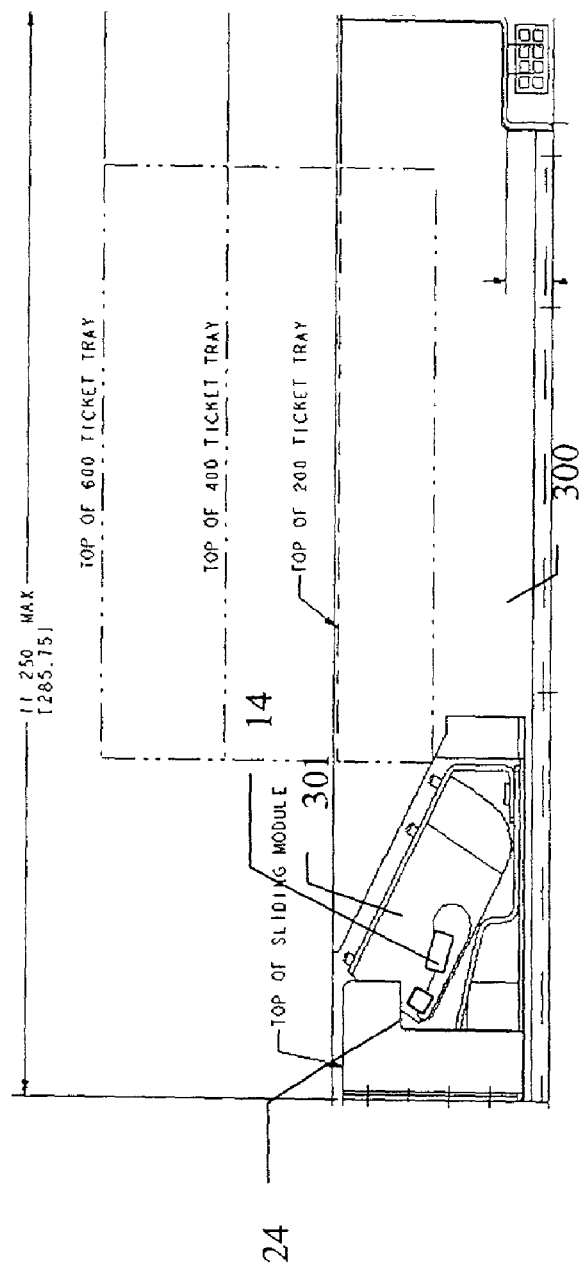
FIG. 3 is an illustration of an exemplary gaming printer in accordance with the present invention.

FIG. 3 is an illustration of an exemplary gaming printer including an exemplary validation character string verification system in accordance with the present invention. A gaming printer 300 includes a printing mechanism 301. The printing mechanism includes a print head 14 for printing vouchers and a voucher scanning device 24 for scanning a validation character string. In one embodiment of a validation character string verification system, the print head and voucher scanning device are physically located such that the voucher scanning device can scan the voucher for the validation character string and a printer controller can finish a verification process of the validation character string before the print head has finished printing the voucher. In another embodiment of a validation character string verification system, the printer can invalidate the voucher before the voucher leaves the printer mechanism. In another embodiment of a validation character string verification system, the printer can retrieve a voucher so that a player cannot obtain the voucher if the voucher fails the verification process.

Figure 4:
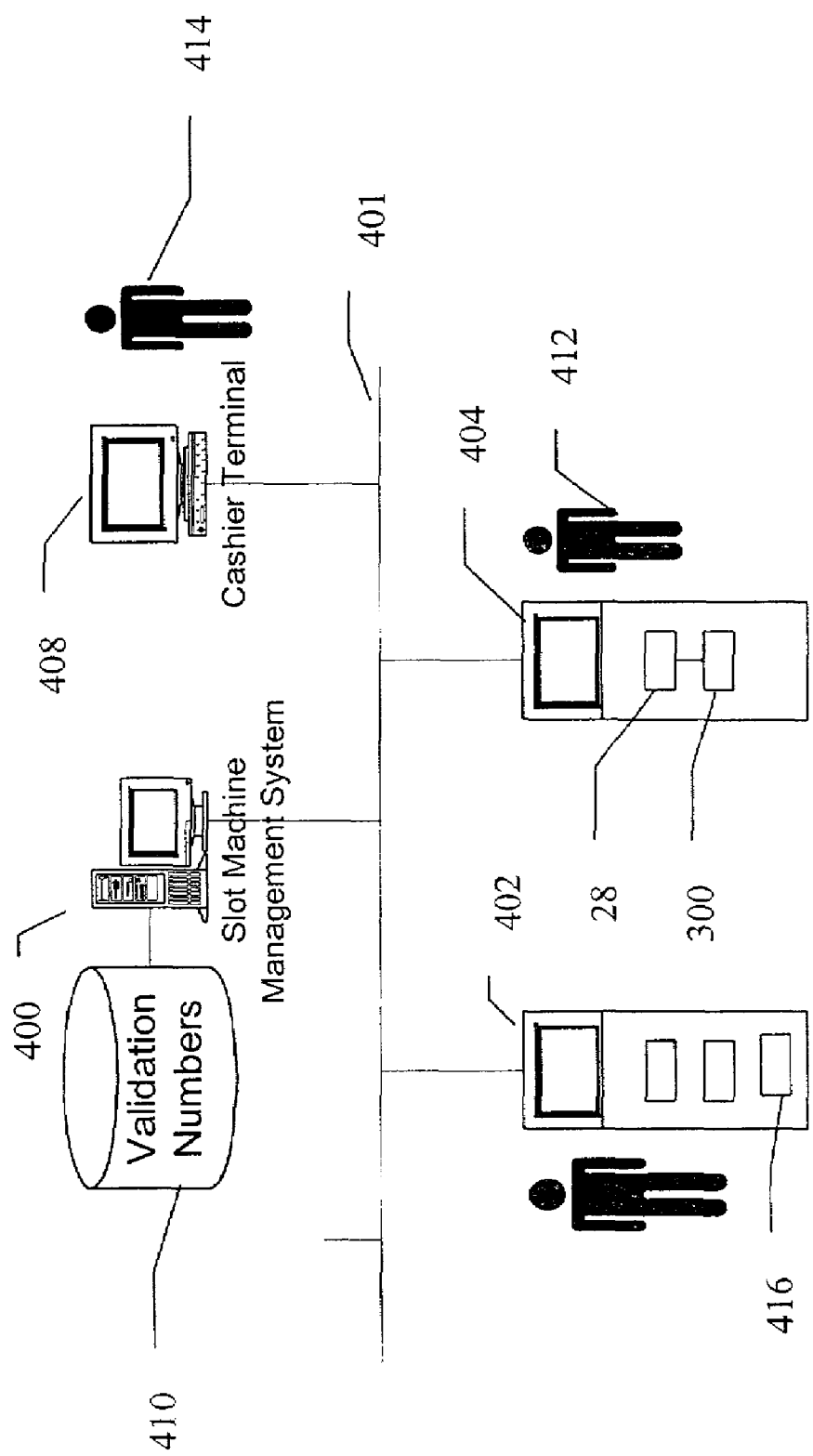
FIG. 4 is an illustration of an exemplary gaming printer incorporated into an exemplary gaming machine management system in accordance with the present invention.

FIG. 4 is an illustration of an exemplary gaming printer incorporated into an exemplary gaming machine management system in accordance with the present invention. A gaming machine management system 400, such as a slot machine management system, is operably coupled to a plurality of gaming machines 402, 404, by a communications network 405 adapted for communications using a variety of protocols. The gaming machine management system is further operably coupled to a cashier's terminal 408. In operation, a player 412 plays the gaming machine and requests a cashout voucher (not shown). The gaming machine uses a gaming printer 300 to print a cashout voucher including a validation character string. The player takes the voucher to a cashier 414. The cashier uses the cashier terminal to enter the validation character sting included in the voucher into the gaming machine management system. The gaming machine management system validates the voucher for the cashier. If the gaming machine management system validates the voucher using the validation character string, the cashier pays the player the cashout value of the voucher.

In one embodiment of a gaming machine management system, the gaming machine management system is operably coupled to a gaming machine via a GMIB 28. The GMIB receives gaming machine management system signals transmitted by the gaming machine management system for management of the functions of a gaming machine. Additionally, the GMIB transmits gaming machine status signals to the gaming machine management system. For example, the GMIB receives voucher verification signals generated by the previously described voucher verification process as implemented within the gaming printer. If a voucher fails the verification process, the validation character string is transmitted to the gaming machine management system for further processing such as alerting casino personnel.

In one embodiment of a gaming machine management system, the validation character string represents an account identifier generated by the gaming machine management system for cashout transactions. The validation character string is associated with an account wherein a monetary amount equal to the value of a voucher's cashout value is stored. In this embodiment, the validation character string is used by the cashier to access the account for a transaction such as cashing the voucher for a player. Additionally, the player may use the voucher in another gaming machine's bill acceptor 410. When the voucher is cashed by the player, or the voucher is used in another gaming machine's bill acceptor 416, the voucher account is emptied and deleted by the gaming machine management system.

Figure 5:
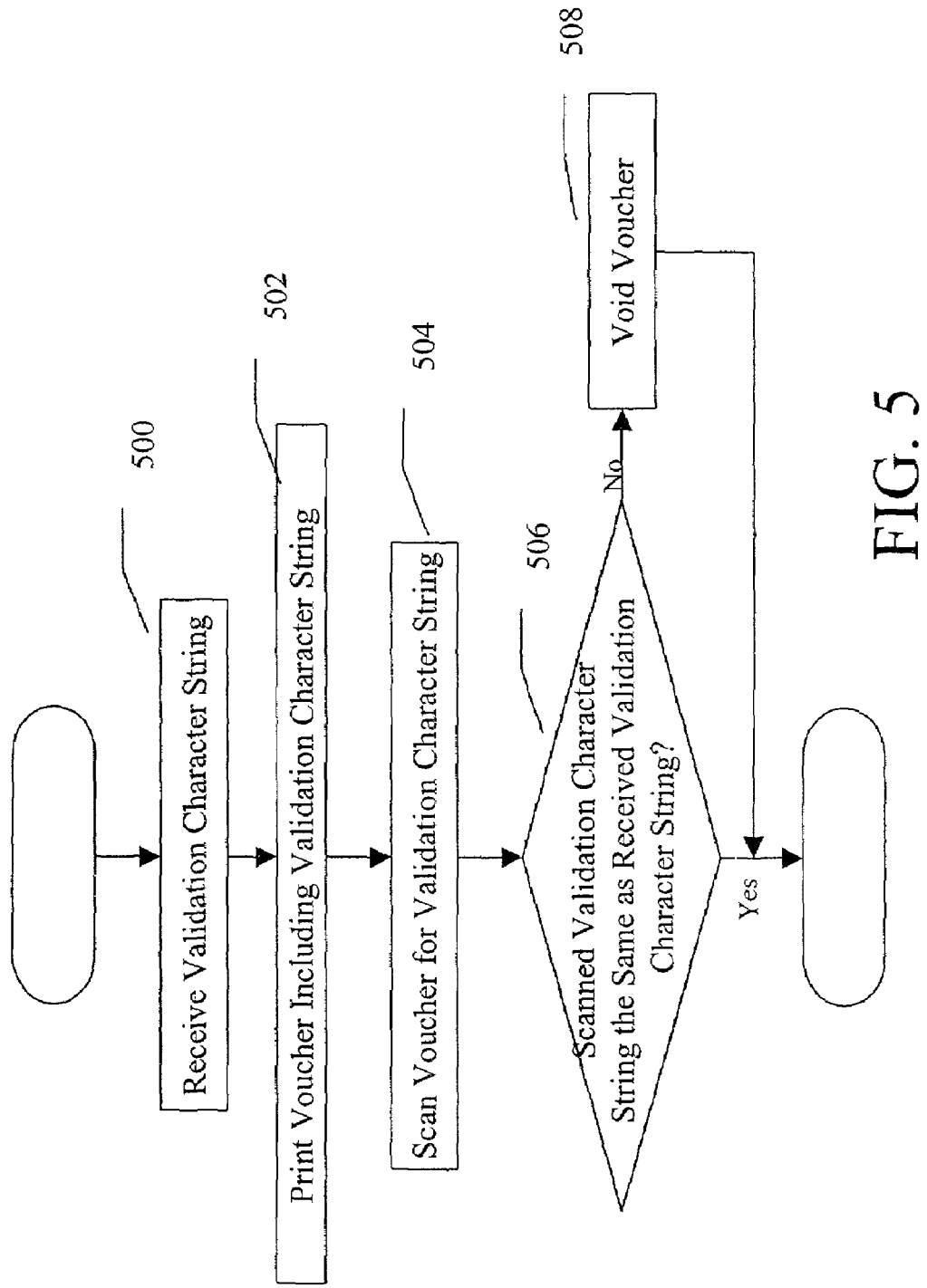
FIG. 5 is a process flow diagram of a validation character string verification process in accordance with the present invention.

FIG. 5 is a process flow diagram of a validation character string verification process in accordance with the present invention. A printer controller receives 500 a validation character string. The printer controller prints 502 a voucher including the received validation character string. The printer controller does so by using the received validation character string to generate print head control signals. The printer controller transmits the print head control signals to a print head. The print head receives the print head control signals and uses them to print a voucher including the validation character string. The printer controller scans 504 the voucher for a scanned validation character string as the print head is printing the voucher. The printer controller scans the voucher using a voucher scanning device. The voucher scanning device generates voucher scan signals including the scanned validation character string by scanning the voucher as the voucher is being printed. The printer controller receives the voucher scan signals including the scanned validation character string.

In one embodiment of a validation character string verification process, the printer controller generates a scanned validation character string using the voucher scan signals in an OCR process. In another embodiment of a validation character string verification process, the voucher scan signals include a scanned validation character string generated in an OCR process by the voucher scanning device.

The printer controller compares the scanned validation character string and the received validation character string to verify 506 the scanned validation character string. If the verification process fails, the printer controller voids 508 the voucher.

In an embodiment of a validation character string verification process, the printer controller receives the validation character string to be printed from a GMIB. In another embodiment of a validation character string verification process, the printer controller receives the validation character string to be printed from a gaming machine management system.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by any claims supported by this application and the claims' equivalents rather than the foregoing description.

What is claimed is:

1. A method for verification of a voucher by a gaming printer, comprising:
   receiving a validation character string by the gaming printer;
   printing the received validation character string on the voucher by the gaining printer;
   scanning the voucher for a scanned validation character string;
   verifying the voucher by the gaming printer using the received validation character string and the scanned validation character string; and
   voiding the voucher by the gaming printer by retracting the voucher and printing voiding marks on the voucher if the voucher is not verified.

2. The method of claim 1 wherein the received validation character string is generated by a gaming machine interface board.

3. The method of claim 1 wherein the received validation character string is received from a gaming machine management system.

4. The method of claim 1 wherein the scanned validation character swing is generated using an optical character recognition process.

5. The method of claim 4 wherein the optical character recognition process is performed by a printer controller.

6. The method of claim 4 wherein the optical character recognition process is performed by a voucher scanning device.

7. The method of claim 1 wherein the voucher is verified by comparing the received validation character string and the scanned validation character string.

8. The method of claim 1 wherein voiding the voucher further comprises retrieving the voucher if the voucher is not verified.

9. The method of claim 1 wherein the voucher is scanned while the voucher is being printed.

10. An apparatus for verification of a voucher by a gaming printer, comprising:
   means for receiving a validation character string;
   means for printing the received validation character string on the voucher;
   means for scanning the voucher for a scanned validation character string;
   means for verifying the voucher using the received validation character string and the scanned validation character string; and
   means for voiding the voucher by the gaming printer retracting the voucher and printing voiding marks on the voucher if the voucher is not verified.

11. The apparatus of claim 10 further comprising means for generating the scanned validation character string using an optical character recognition process.

12. The apparatus of claim 11 wherein the optical character recognition means is included in the voucher scanning means.

13. The apparatus of claim 10 wherein the means for verifying the voucher further includes means for comparing the received validation character siring and the scanned validation character string.

14. The apparatus of claim 10 wherein the means for voiding the voucher further comprises means for retrieving the voucher if the voucher is not verified.

15. The apparatus of claim 10 wherein the voucher is scanned while the voucher is being printed.

16. A method for verification of a voucher by a gaming printer, comprising:
   receiving a validation character string;
   printing the validation character string and a barcode on the voucher using the received validation character string by the gaming printer;
   scanning the voucher for a scanned validation character string and a scanned barcode;
   verifying the voucher using the scanned validation character string and the scanned barcode by the gaining printer; and
   voiding the voucher by the gaming printer by retracting the voucher and printing voiding marks on the voucher if the voucher is not verified.

17. The method of claim 16 wherein the received validation character string is generated by a gaining machine interface board.

18. The method of claim 16 wherein the received validation character string is received from a gaming machine management system.

19. The method of claim 16 wherein the scanned validation character string is generated using an optical character recognition process.

20. The method of claim 19 wherein the optical character recognition process is performed by a printer controller.

21. The method of claim 19 wherein the optical character recognition process is performed by a voucher scanning device.

22. The method of claim 16 wherein the voucher is verified by comparing the scanned validation character string and the scanned barcode.

23. The method of claim 16 wherein voiding the voucher further comprises retrieving the voucher if the voucher is not verified.

24. The method of claim 16 wherein the voucher is scanned while the voucher is being printed.

25. An apparatus for verification of a voucher by a gaming printer, comprising:
   means for receiving a validation character string;
   means for printing a validation character string and a barcode on the voucher using the received validation character string;
   means for scanning the voucher for a scanned validation character string and a scanned barcode;
   means for verifying the voucher using the scanned validation character string and the scanned barcode; and
   means for voiding the voucher by retracting the voucher and printing voiding marks on the voucher if the voucher is not verified.

26. The apparatus of claim 25 further comprising means for generating the scanned validation character string using an optical character recognition process.

27. The apparatus of claim 26 wherein the optical character recognition means is included in the voucher scanning means.

28. The apparatus of claim 25 wherein the means for verifying the voucher further includes means for comparing the scanned validation character string and the scanned barcode.

29. The apparatus of claim 25 wherein the means for voiding the voucher further comprises means for retrieving the voucher if the voucher is not verified.

30. The apparatus of claim 25 wherein the voucher is scanned while the voucher is being printed.

* * * * *

UNITED STATES PATENT AND TRADEMARK OFFICE
CERTIFICATE OF CORRECTION

PATENT NO. : 7,134,962 B2 Page 1 of 1
APPLICATION NO. : 10/021624
DATED : November 14, 2006
INVENTOR(S) : Meyerhofer et al.

It is certified that error appears in the above-identified patent and that said Letters Patent is hereby corrected as shown below:

COLUMN 1:
Line 45, "printers" should read -- printer --.

COLUMN 6:
Line 66, "swing" should read -- string --.

COLUMN 8:
Line 2, "gaining" should read -- gaming --.

Signed and Sealed this

Eighteenth Day of March, 2008

JON W. DUDAS
*Director of the United States Patent and Trademark Office*